Patented May 8, 1945

2,375,376

UNITED STATES PATENT OFFICE 2,375,376

METHOD OF EXTRACTING PECTINOUS MATERIALS

William Dayton Maclay and John P. Nielsen, Berkeley, Calif., assignors to the United States of America, as represented by the Secretary of Agriculture No Drawing. Application March 31, 1944, Serial No. 529,015

5 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the extraction of pectinous materials, and has among its objects the provision of an improved extraction method which produces greater yields of pectinous products having good jellying power in shorter periods of extraction than has heretofore been possible.

Little precise information is known concerning the state and condition of pectinous materials as they exist in situ in plants. In general, the protopectin is considered to be a component of the cell walls, while the middle lamella has been shown to consist primarily of calcium pectate. Protopectin, the precursor of pectin, has been defined by the Committee on Pectin Nomenclature of the American Chemical Society as "the term applied to the water-insoluble, unhydrolyzed pectin substances in the state in which they occur in plant tissues. Protopectins are rendered soluble by treatment with enzymes, acids or other reagents, whether by peptization or hydrolysis not being known. The substances thus rendered soluble are designated collectively as pectin; . . . ." J. Am. Chem. Soc., 49 Proc. 37 (1927). Early investigators—prior to 1850—considered protopectin to be an insoluble calcium compound, and certain later investigators held the same view since such substances as ammonium oxalate and oxalic acid are capable of liberating pectin from the parent material while such salts as sodium chloride are unable to effect the same change. The more generally accepted view at the present time, however, is that protopectin is a combination of pectin and cellulose since the protopectin is always found in close association with other cell-wall constituents.

The problem of extracting pectin is essentially a matter of treating the source material in such a manner as to liberate the soluble pectin from the insoluble protopectin. A number of processes, such as acidic and enzymic hydrolysis and the use of salts, have been suggested for accomplishing pectin extraction. The principal commercial method consists in heating an aqueous dispersion of a pectin-containing material under carefully controlled conditions of hydrogen-ion concentration, temperature, and time. The conditions generally thought to be optimum are a pH of 2 to 3, a temperature of 60° to 100° C., and a time of 30 to 120 minutes.

We have found that by using a calcium complex-forming agent which is effective in strongly acidic media, the time heretofore required for the extraction of pectinous materials can be reduced and the yields substantially increased without impairing the quality of the product obtained. In our process, an aqueous slurry of a pectin-containing material, particularly one whose ash content is rich in calcium, is adjusted to a pH of 2 to 4 with a mineral acid. A calcium complex-forming agent, such as sodium hexametaphosphate—$(NaPO_3)_6$, sodium tetrametaphosphate—$(NaPO_3)_4$, or sodium tetraphosphate—$(Na_6P_4O_{13})$ is then added in a concentration of approximately 0.25 to 0.5 percent, and the resulting mixture is heated at about 60° C. to boiling temperature for about 10 to 120 minutes, after which the extraction mixture is filtered and the pectinous material is precipitated in 50 percent ethanol, and the precipitate is then hardened and dried. We have obtained increases in yield ranging from approximately 25 to 60 percent under these conditions.

The process is illustrated by the following examples:

EXAMPLE I

To 500 g. (85 g. dry weight) of ground orange peel dispersed in 1500 ml. of water and adjusted to a pH of 2.5 with sulfuric acid, 10 g. of sodium hexametaphosphate was added. The slurry was heated at boiling temperature for 30 minutes with stirring. The reaction mixture was filtered and the pectin was precipitated with one volume of ethanol, after which it was hardened in alcohol, and then collected and dried. Yield: 18.4 g. (ash- and moisture-free basis) of 171-grade pectin.

An extraction of 500 g. of orange peel, from the same lot, under the same reaction conditions but without sodium hexametaphosphate yielded 11.2 g. (ash- and moisture-free basis) of 174-grade pectin.

EXAMPLE II

T 500 g. (85 g. dry weight) of ground orange peel dispersed in 1500 ml. of water and adjusted to a pH of 2.5 with sulfuric acid, 10 g. of sodium hexametaphosphate was added. The reaction mixture was heated at boiling temperature for 10 minutes with stirring. The slurry was filtered, the filtrate was cooled and the pectin was precipitated with ethanol, after which it was hardened in ethanol, and then collected and dried. Yield: 16.3 g. (ash- and moisture-free basis) of 200-grade pectin.

EXAMPLE III

To 500 g. (106 g. dry weight) of disintegrated grapefruit peel dispersed in 1500 ml. of water and adjusted to a pH of 2.5 with sulfuric acid, 10 g. of sodium hexametaphosphate was added. The reaction mixture was heated at 95° to 98° C. for 30 minutes with stirring. The dispersion was filtered, the filtrate was cooled, and the pectin was precipitated and hardened with alcohol, and then collected and dried. Yield: 17.1 g. of 165-grade pectin.

An extraction of 500 g. of grapefruit peel, from the same lot, under the same reaction conditions but without sodium hexametaphosphate, yielded 8.5 g. of 165-grade pectin.

EXAMPLE IV

To 500 g. (85 g. dry weight) of ground lemon peel dispersed in 1500 ml. of water adjusted to a pH of 2.5 with sulfuric acid, 10 g. of sodium tetrametaphosphate was added. The reaction mixture was heated at 95 to 98° C. for 15 minutes with stirring. The slurry was filtered, the filtrate was cooled, and the pectin was precipitated and hardened with ethanol, and then collected and dried. Yield: 17.0 g. (ash- and moisture-free basis) of 161-grade pectin.

An extraction of 500 g. of lemon peel, from the same lot, under the same reaction conditions but without sodium tetrametaphosphate yielded 12.9 g. (ash- and moisture-free basis) of 156-grade pectin.

EXAMPLE V

To 500 g. (95 g. dry weight) of thinly sliced lemon peel dispersed in 1500 ml. of water and adjusted to a pH of 2.0 with sulfuric acid, 5.0 g. of sodium hexametaphosphate was added. The reaction mixture was heated at 60° C. for 120 minutes with stirring. The slurry was filtered and the filtrate was cooled to room temperature. The pectin was isolated by adding 160 ml. of 25 percent aluminum chloride solution to the filtrate followed by adjustment of the pH to 4.2–4.4 with 25 percent sodium carbonate solution. The precipitated pectin-aluminum complex was separated from the liquor by pressing. The pectin was liberated from the wet pectin-aluminum complex by treating the latter in the following manner: for each 100 g. was added 60 ml. of 75 percent ethanol containing 5 percent sulfuric acid. The mixture was blended and stirred for 15 minutes followed by the addition of 100 ml. of the same ethanol-sulfuric acid solution and stirring continued for an additional 15 minutes. The material was filtered and resuspended in 150 ml. of 30 percent ethanol containing 10 percent sulfuric acid and stirred for 15 minutes. The pectin was filtered, washed with 50 percent ethanol, resuspended in 150 ml. of 50 percent ethanol and the pH of the mixture adjusted to 4 through the addition of a 50 percent ethanol-5.6 percent ammonium hydroxide solution. The pectin was filtered, washed with 50 percent ethanol, hardened in 95 percent ethanol, and then collected and dried. Yield: 13.4 g. (ash- and moisture-free basis) of 212-grade pectin.

An extraction of 500 g. of lemon peel, from the same lot, under the same reaction conditions but without sodium hexametaphosphate, yielded 10.9 g. of 214 grade pectin.

The effect of the concentration of the calcium complex forming agent and of the reaction time employed in the extraction of pectinous materials is shown by the data tabulated below.

TABLE I

*Effect of concentration of sodium hexametaphosphate on yield of pectin [1]*

| Sodium hexametaphosphate per cent conc'n. | Water: peel ratio | Time, min. | Yield [2] (a) per cent | Grade [2] (b) | Jelly units [2] (a)×(b) |
|---|---|---|---|---|---|
| 0.0 | 3 | 30 | 13.0 | 175 | 23 |
| 0.1 | 3 | 30 | 15.0 | 170 | 26 |
| 0.3 | 3 | 30 | 19.0 | 170 | 32 |
| 0.5 | 3 | 30 | 21.5 | 170 | 37 |
| 1.0 | 3 | 30 | 22.5 | 170 | 38 |

[1] As measured by single extractions of 500 g. of blanched, ground orange peel at boiling temperature and at a pH of 2.5.
[2] Yield, grade and jelly units calculated on ash- and moisture-free basis.

The data in Table I indicate that about 0.5 percent is a sufficient concentration of sodium hexametaphosphate, and that the use of this material in the extraction process does not degrade the pectin obtained.

TABLE II

*Effect of extraction period on yield of pectin [1]*

| Extraction period, min. | Sodium hexametaphosphate per cent conc'n. | Water: peel ratio | Yield [2] (a) percent | Grade [2] (b) | Jelly units [2] (a)×(b) |
|---|---|---|---|---|---|
| 10 | 0.5 | 3 | 19.0 | 200 | 38 |
| 15 | 0.5 | 3 | 20.1 | 180 | 36 |
| 30 | 0.5 | 3 | 21.5 | 170 | 37 |

[1] As measured by single extractions of 500 g. of blanched, ground orange peel at boiling temperature and at a pH of 2.5.
[2] Yield, grade and jelly units calculated on ash- and moisture-free basis.

Table II shows that a very large proportion of the pectin is extracted during the first 10 minutes, and that the slightly greater yields resulting from a longer extraction period are counterbalanced by a lowering of the grade of the pectin obtained due to degradation of the pectin molecule.

Our invention is not limited to the source materials which are used above as illustrations, but is applicable generally to pectin-bearing materials, such as carrots, pea hulls, sugar beets, quinces, grapes, and so forth. Nor is our invention limited to the extraction of a pectin of relatively high methoxyl content. It is even more effective in the extraction of low-methoxyl pectins, because the susceptibility to precipitation by calcium increases as the methoxyl content of the pectin is lowered. In addition, other alkali metaphosphates and polyphosphates, particularly potassium tetrametaphosphate, potassium hexametaphosphate or potassium tetraphosphate may be used in place of sodium tetrametaphosphate or sodium hexametaphosphate.

Having thus described our invention, we claim:

1. The process of extracting pectinous materials which comprises forming an aqueous dispersion of a pectin-containing material, adjusting the dispersion to a pH of about 2 to 4, adding a compound selected from the group consisting of alkali metaphosphates and alkali polyphosphates to the dispersion in a concentration of approximately 0.25–0.5 percent, and then heating the resulting mixture at about 60° C. to boiling temperature for about 10 to 120 minutes.

2. The process of extracting pectinous materials which comprises forming an aqueous dispersion of a pectin-containing material, adjusting the dispersion to a pH of about 2 to 4 with a mineral acid, adding sodium hexametaphosphate to the dispersion in a concentration of approximately 0.25–0.5 percent, and then heating the resulting mixture at about 60° C. to boiling temperature for about 10 to 120 minutes.

3. The process of extracting pectinous materials which comprises forming an aqueous dispersion of a pectin-containing material, adjusting the dispersion to a pH of about 2 to 4 with a mineral acid, adding sodium tetrametaphosphate to the dispersion in a concentration of approximately 0.25–0.5 percent, and then heating the resulting mixture at about 60° C. to boiling temperature for about 10 to 120 minutes.

4. The process of extracting pectinous materials which comprises forming an aqueous dispersion of citrus peel, adjusting the dispersion to a pH of about 2 to 4 with a mineral acid, adding sodium hexametaphosphate to the dispersion in a concentration of approximately 0.25–0.5 percent, and then heating the resulting mixture at about 60° C. to boiling temperature for about 10 to 120 minutes.

5. The process of extracting pectinous materials which comprises forming an aqueous dispersion of citrus peel, adjusting the dispersion to a pH of about 2 to 4 with a mineral acid, adding sodium tetrametaphosphate to the dispersion in a concentration of approximately 0.25–0.5 percent, and then heating the resulting mixture at about 60° C. to boiling temperature for about 10 to 120 minutes.

WILLIAM DAYTON MACLAY.
JOHN P. NIELSEN.